(12) United States Patent
Gillis

(10) Patent No.: US 8,805,008 B1
(45) Date of Patent: Aug. 12, 2014

(54) TRACKING CLOSELY SPACED OBJECTS IN IMAGES

(75) Inventor: James Ridgeway Gillis, Seattle, WA (US)

(73) Assignee: The Boeing Company, Chicago, IL (US)

( * ) Notice: Subject to any disclaimer, the term of this patent is extended or adjusted under 35 U.S.C. 154(b) by 244 days.

(21) Appl. No.: 13/287,810

(22) Filed: Nov. 2, 2011

(51) Int. Cl.
*G06K 9/00* (2006.01)
*G06K 9/62* (2006.01)
*G06K 9/36* (2006.01)

(52) U.S. Cl.
USPC ............ 382/103; 382/107; 382/225; 382/288

(58) Field of Classification Search
None
See application file for complete search history.

(56) References Cited

U.S. PATENT DOCUMENTS

| | | | |
|---|---|---|---|
| 5,798,942 A * | 8/1998 | Danchick et al. | 342/96 |
| 6,196,496 B1 * | 3/2001 | Moskovitz et al. | 244/3.15 |
| 7,236,613 B2 | 6/2007 | Murata | |
| 2005/0045825 A1 * | 3/2005 | Murata | 250/342 |
| 2006/0257004 A1 * | 11/2006 | Chen | 382/103 |
| 2008/0114564 A1 * | 5/2008 | Ihara | 702/158 |

FOREIGN PATENT DOCUMENTS

| | | | |
|---|---|---|---|
| JP | 2004251660 A | * | 9/2004 |
| JP | 2007147306 A | * | 6/2007 |

OTHER PUBLICATIONS

Korn, et al., "Trajectory Estimation of Closely Spaced Objects (CSO) Using Infrared Focal Plane Data of an STSS (Space Tracking and Surveillance System) Platform," Signal and Data Processing of Small Targets 2004, Proceedings of SPIE, vol. 5428 (13 pages).

* cited by examiner

*Primary Examiner* — Jason M Repko
*Assistant Examiner* — Ryan P Potts
(74) *Attorney, Agent, or Firm* — Yee & Associates, P.C.

(57) ABSTRACT

A method and apparatus for tracking a cluster of objects. A path for a center of mass for the cluster of objects is identified using a sequence of frames of sensor data generated by a sensor system. The path is identified with respect to a coordinate system for the sensor data. A relative path for each object in the cluster of objects is identified with respect to the coordinate system for the sensor data. The relative path is relative to the path for the center of mass for the cluster of objects. A final path for each object in the cluster of objects is identified with respect to the coordinate system for the sensor data using the path for the center of mass for the cluster of objects and the relative path for each object in the cluster of objects.

27 Claims, 8 Drawing Sheets

TRACKING CLOSELY SPACED OBJECTS IN IMAGES

BACKGROUND INFORMATION

1. Field

The present disclosure relates generally to processing images and, in particular, to tracking objects in images. Still more particularly, the present disclosure relates to a method and apparatus for tracking closely spaced objects (CSOs) in images.

2. Background

Sensor systems may be used to detect and track different types of objects that move in an area. These different types of objects may include, for example, without limitation, aircraft, unmanned aerial vehicles (UAVs), spacecraft, satellites, missiles, automobiles, tanks, unmanned ground vehicles (UGVs), people, animals, and other suitable types of objects. Further, these objects may be detected and tracked using different types of sensor systems. These different types of sensor systems may include, for example, without limitation, visible light imaging systems, electro-optical (EO) imaging systems, infrared (IR) sensor systems, near-infrared sensor systems, ultraviolet (UV) sensor systems, radar systems, and other types of sensor systems.

As one illustrative example, a sensor system may be used to generate images of an area. These images may take the form of video, for example. These images may be used to detect and track objects of interest in the area. In some situations, two or more objects that are within close proximity in the area being observed may appear in a same region of an image. These objects may be referred to as a "cluster". For example, when the lines of sight from a sensor system to two or more objects in the area being observed are within some selected proximity of each other, the portions of the image representing these objects may partially overlap such that the objects appear as a cluster in the image.

When the portions of an image representing these objects overlap more than some selected amount in the different images in a sequence of images, distinguishing between and tracking the different objects in the cluster in the sequence of images may be more difficult than desired. Some currently available methods for distinguishing between the objects in a cluster in a sequence of images may take more time, effort, and/or processing resources than desired. Further, these currently available methods may be unable to track movement of the objects with a desired level of accuracy.

Therefore, it would be advantageous to have a method and apparatus that takes into account at least some of the issues discussed above, as well as possibly other issues.

SUMMARY

In one advantageous embodiment, a method is provided for identifying information about a cluster of objects. A path for a center of mass for the cluster of objects is identified using a sequence of frames of sensor data generated by a sensor system. The path is identified with respect to a coordinate system for the sensor data. A relative path for each object in the cluster of objects is identified with respect to the coordinate system for the sensor data. The relative path is relative to the path for the center of mass for the cluster of objects. A final path for each object in the cluster of objects is identified with respect to the coordinate system for the sensor data using the path for the center of mass for the cluster of objects and the relative path for each object in the cluster of objects.

In another advantageous embodiment, an apparatus comprises a data processing system. The data processing system is configured to identify a path for a center of mass for a cluster of objects using a sequence of frames of sensor data generated by a sensor system. The path is identified with respect to a coordinate system for the sensor data. The data processing system is configured to identify a relative path for each object in the cluster of objects with respect to the coordinate system for the sensor data. The relative path is relative to the path for the center of mass for the cluster of objects. The data processing system is configured to identify a final path for each object in the cluster of objects with respect to the coordinate system for the sensor data using the path for the center of mass for the cluster of objects and the relative path for each object in the cluster of objects.

The features, functions, and advantages can be achieved independently in various embodiments of the present disclosure or may be combined in yet other embodiments in which further details can be seen with reference to the following description and drawings.

Figure 1:
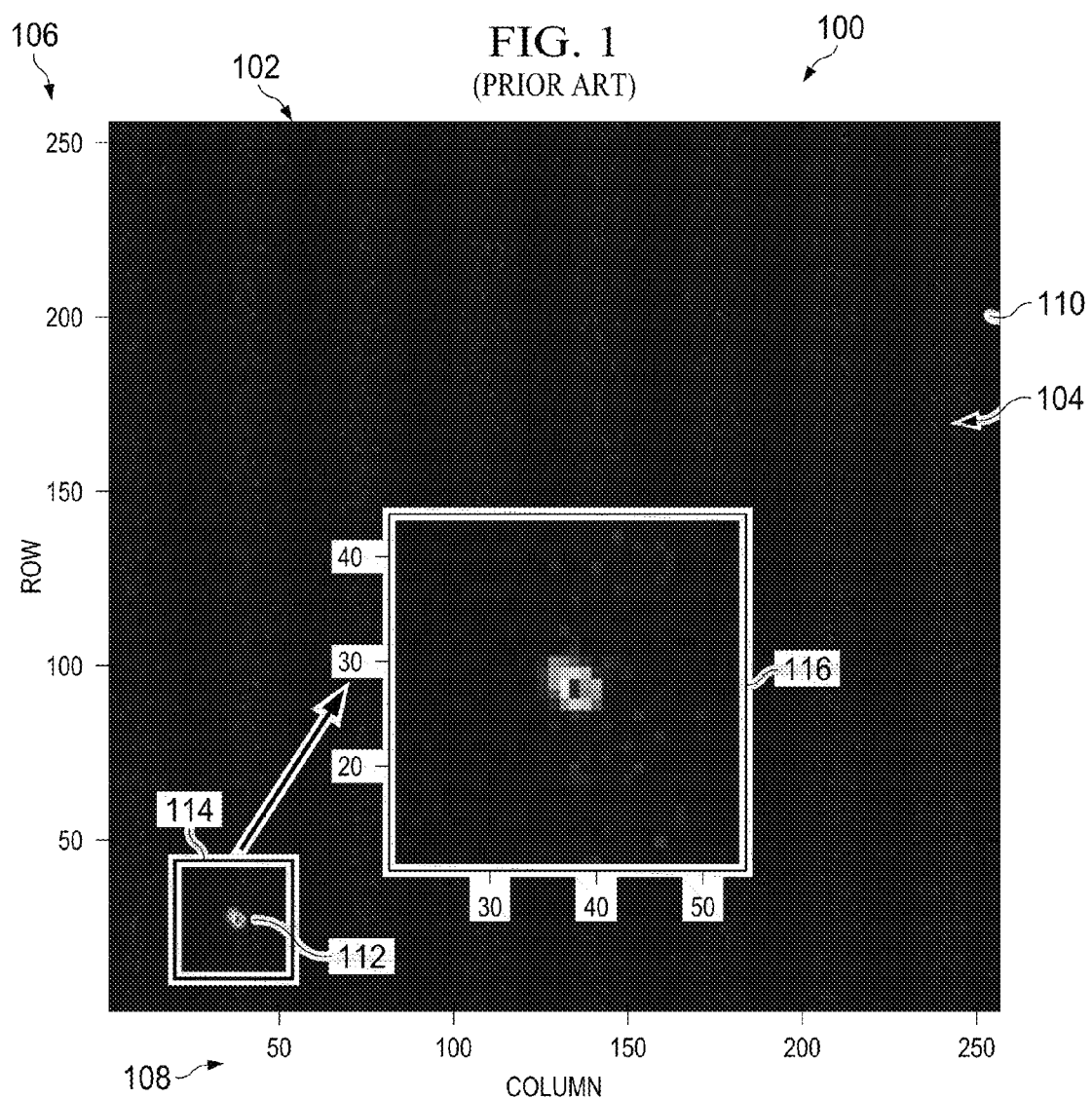
FIG. 1 is an illustration of an image in which a cluster of closely spaced objects is present in accordance with an advantageous embodiment.

The novel features believed characteristic of the advantageous embodiments are set forth in the appended claims. The advantageous embodiments, however, as well as a preferred mode of use, further objectives, and advantages thereof will best be understood by reference to the above detailed description of an advantageous embodiment of the present disclosure when read in conjunction with the accompanying drawings.

DETAILED DESCRIPTION

The different advantageous embodiments recognize and take into account different considerations. For example, the different advantageous embodiments recognize and take into account that tracking the individual objects in a cluster of closely spaced objects (CSOs) in a sequence of images may take more time, effort, and/or processing resources than desired using some currently available methods for detecting and tracking objects in images.

As used herein, a "sequence of images" means two or more images ordered with respect to time. In other words, consecutive images in a sequence of images are ordered with respect to time. Further, as used herein, "closely spaced objects" refers to two or more objects that appear close enough to each other in an image such that the individual objects may not be resolved without further processing of the image. Additionally, "resolving" objects, as used herein, means distinguishing between the different objects.

The different advantageous embodiments recognize and take into account that some currently available techniques for resolving and tracking closely spaced objects in a cluster in a sequence of images estimate parameters for each of the closely spaced objects in each image in the sequence of images. These parameters may include, for example, a location of the object and a radiant intensity for the object. A radiant intensity for an object is a measure of the electromagnetic radiation emitted or reflected off of the object. As the number of objects and number of images in the sequence of images increases, the number of parameters that need to be estimated and the number of processing operations that need to be performed also increase.

Further, the different advantageous embodiments recognize and take into account that other currently available methods for resolving and tracking closely spaced objects in a cluster in a sequence of images include estimating a path of movement and a trend in the radiant intensity for each of the closely spaced objects over the sequence of images. The path of movement for an object may be estimated by estimating values for a fixed number of parameters for each object that are independent of the number of images in the sequence of images.

In particular, estimating the path of movement for each of the closely spaced objects includes fitting a fixed number of parameters for each of the closely spaced objects to a first-order polynomial function. In other words, these methods assume that the path of movement for one of the closely spaced objects may be a linear path. More specifically, these methods assume that the path of movement may be a substantially straight line.

However, the different advantageous embodiments recognize and take into account that objects may not always move in a substantially straight line over time. For example, the path of movement for an object may follow the form of some other suitable type of function. As one illustrative example, a missile may be maneuvered such that the missile has a smooth but nonlinear path during flight.

Further, the different advantageous embodiments also recognize and take into account that estimating the path of movement for each of the closely spaced objects by directly fitting the path for each of the closely spaced objects over the sequence of images without constraints may lead to solutions less accurate than desired. The different advantageous embodiments recognize and take into account that imposing limits on the values estimated for the parameters for each of the closely spaced objects when fitting the path for each object may reduce the amount of time and the number of operations needed to estimate the path of movement for each object and increase the accuracy of this estimation.

The different advantageous embodiments recognize and take into account that identifying a center of mass for a cluster of closely spaced objects in each image in the sequence of images may be desirable.

Further, an assumption may be made that the closely spaced objects in the cluster may not move away from the center of mass of the cluster more than some selected amount in any of the images in the sequence of images. The different advantageous embodiments recognize and take into account that making this assumption may reduce the amount of time and number of operations needed to estimate the path of movement for the object and increase the accuracy of this estimation.

Additionally, the different advantageous embodiments recognize and take into account that some currently available methods for resolving and tracking closely spaced objects in a cluster in a sequence of images may require an assumption of the number of objects in the cluster. The different advantageous embodiments recognize and take into account that having a system that is capable of estimating the number of objects in the cluster using the sequence of images may be desirable.

With reference now to FIG. 1, an illustration of an image in which a cluster of closely spaced objects is present is depicted. In this illustrative example, image 100 takes the form of focal plane image 102. As used herein, a "focal plane image" is an image generated using a sensor system that uses a focal plane array. Typically, a focal plane array is an array of sensor elements in which each sensor element is configured to detect electromagnetic radiation and generate an electrical signal in response to this detection.

In this illustrative example, image 100 is divided into pixels 104 having pixel values. Each pixel in pixels 104 may correspond to a sensor element in the focal plane array.

As depicted, pixels 104 are arranged in rows 106 and columns 108. The pixel value for each pixel in pixels 104 identifies an intensity and/or color for that pixel. The intensity and/or color of a pixel is a representation of the amount of electromagnetic radiation detected at the corresponding sensor element in the focal plane array. In particular, the pixel value may represent an intensity of electromagnetic radiation detected at the corresponding sensor element.

In this illustrative example, image 100 includes background 110 and cluster 112. Cluster 112 is present in region 114 of image 100. In this illustrative example, region 114 is enlarged in window 116 to allow cluster 112 to be seen more clearly.

As depicted, cluster 112 takes the form of a group of pixels in pixels 104 that are distinct from background 110. This group of pixels represents a plurality of objects. In particular, the objects in cluster 112 are closely spaced objects. In other words, the different objects present in cluster 112 in image 100 may be indistinguishable to the human eye. When the different objects in a cluster, such as cluster 112, have yet to be distinguished and/or information about the objects in the cluster has yet to be identified, this cluster may be referred to as an "unresolved" cluster.

The different advantageous embodiments recognize and take into account that image 100 may be one image in a sequence of images. Further, the different advantageous embodiments recognize and take into account that having a method for determining the number of objects represented in cluster 112 may be desirable. Further, the different advantageous embodiments recognize and take into account that having a method for tracking the movement of the individual objects in cluster 112 over the sequence of images to which image 100 belongs may be desirable.

Thus, the different advantageous embodiments provide a method and apparatus for tracking closely spaced objects in images. In one advantageous embodiment, a method is provided for identifying information about a cluster of objects. A path for a center of mass for the cluster of objects is identified using a sequence of frames of sensor data generated by a sensor system. The path is identified with respect to a coordinate system for the sensor data. A relative path for each object in the cluster of objects is identified with respect to the coordinate system for the sensor data. The relative path is relative to the path for the center of mass for the cluster of objects. A final path for each object in the cluster of objects is identified with respect to the coordinate system for the sensor data using the path for the center of mass for the cluster of objects and the relative path for each object in the cluster of objects.

Figure 2:
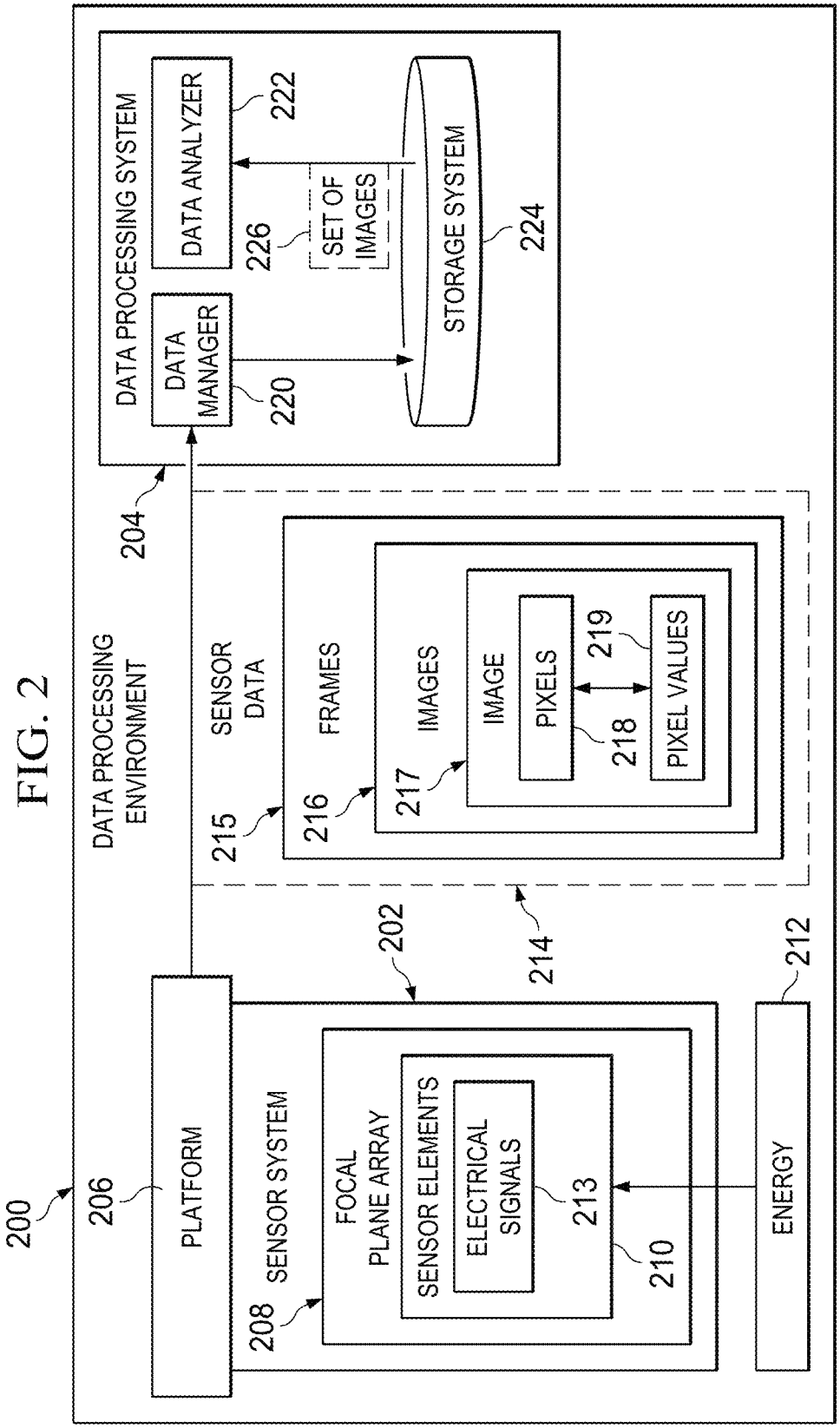
FIG. 2 is an illustration of a data processing environment in the form of a block diagram in accordance with an advantageous embodiment.

With reference now to FIG. 2, an illustration of a data processing environment in the form of a block diagram is depicted in accordance with an advantageous embodiment. In these illustrative examples, data processing environment 200 includes sensor system 202 and data processing system 204.

As depicted, sensor system 202 may be associated with platform 206. Platform 206 may take the form of, for example, without limitation, a mobile platform, a stationary platform, a land-based structure, an aquatic-based structure, a space-based structure, an aircraft, a surface ship, a tank, a personnel carrier, a train, a spacecraft, a space station, a satellite, a submarine, an automobile, a power plant, a bridge, a dam, a manufacturing facility, a building, a manmade structure, or some other suitable type of platform.

The association between sensor system 202 and platform 206 is a physical association in these depicted examples. A first component, such as sensor system 202, may be considered to be "associated with" a second component, such as platform 206, by being secured to the second component, bonded to the second component, mounted to the second component, welded to the second component, fastened to the second component, and/or connected to the second component in some other suitable manner. The first component also may be connected to the second component using a third component. The first component also may be considered to be associated with the second component by being formed as part of and/or an extension of the second component.

Sensor system 202 may take a number of different forms. For example, sensor system 202 may take the form of a "staring sensor system" that is configured to observe a same portion of an area over time. In some cases, sensor system 202 may take the form of a "scanning sensor system" that is configured to scan different portions of an area over time.

Sensor system 202 may be any sensor system configured to detect energy 212. In these illustrative examples, energy 212 may take the form of electromagnetic radiation. For example, sensor system 202 may take the form of a visible light imaging system, an electro-optical imaging system, an infrared imaging system, an ultraviolet imaging system, or some other suitable type of sensor system configured to detect electromagnetic radiation.

As depicted, sensor system 202 is configured to generate sensor data 214 in response to detecting energy 212. Sensor data 214 may be generated in the form of frames 215 of sensor data 214. As used herein, a "frame" of sensor data 214 is data generated at a particular point in time. In other words, each frame of sensor data 214 in frames 215 is generated at a different point in time. In these illustrative examples, frames 215 of sensor data 214 take the form of images 216. In some illustrative examples, images 216 may form video.

Image 217 is an example of one of images 216. Image 217 is divided into pixels 218 having pixel values 219. As used herein, a "pixel" refers to a two-dimensional geometrical shape in an image. The "pixel value" of a pixel identifies an intensity and/or color for that pixel. In one illustrative example, pixels 218 are arranged as a two-dimensional grid of pixels. In other words, pixels 218 are arranged in rows and columns.

In one illustrative example, sensor system 202 is implemented using focal plane array 208. Focal plane array 208 comprises sensor elements 210. Sensor elements 210 are arranged in rows and columns. Sensor elements 210 may take the form of, for example, photoconductive diodes configured to detect energy 212 in the form of photons.

Sensor elements 210 are configured to generate electrical signals 213 in response to detecting energy 212. Sensor system 202 uses electrical signals 213 to generate sensor data 214. In particular, measurements of electrical signals 213 taken at different points in time are used to generate images 216. A measurement of an electrical signal generated by one of sensor elements 210 represents the amount of energy 212 detected at that sensor element. When sensor system 202 is implemented using focal plane array 208, images 216 may be referred to as focal plane images.

In these illustrative examples, sensor system 202 sends images 216 to data processing system 204 for processing. Data processing system 204 processes images 216 to detect and track objects of interest in images 216.

Data processing system 204 may be implemented using hardware, software, or a combination of the two. As one illustrative example, data processing system 204 may be implemented using a number of computers. As used herein, a "number of" items means one or more items. In this manner, a number of computers means one or more computers. When more than one computer is present in data processing system 204, these computers may be in communication with each other. Further, these computers may be in a same location or in different locations, depending on the implementation.

Data processing system 204 may be located remote to platform 206 and sensor system 202 in these illustrative examples. However, in other illustrative examples, at least a portion of data processing system 204 may be associated with platform 206. As used herein, "at least a portion of" data processing system 204 may be some or all of data processing system 204. Further, in some cases, data processing system 204 may be implemented in sensor system 202. For example, at least a portion of data processing system 204 may be implemented in sensor system 202.

Depending on the implementation, data processing system 204 may receive images 216 from sensor system 202 as images 216 are being generated, after all of images 216 have been generated, or after some selected number of images 216 have been generated. When data processing system 204 receives images 216 as images 216 are being generated, data processing system 204 may be receiving images 216 in substantially real-time.

In these illustrative examples, data processing system 204 includes data manager 220 and data analyzer 222. Data manager 220 is configured to manage sensor data 214 received from sensor system 202. For example, when images 216 are received as images 216 are being generated in substantially real-time, data manager 220 may store each image in storage system 224 as each image is received.

In some illustrative examples, data manager 220 may receive all of images 216 at substantially the same time. Data manager 220 may store images 216 in storage system 224 for later use and processing.

Storage system 224 may take a number of different forms. For example, storage system 224 may include one or more of each of a database, a buffer, a server, memory, and other suitable types of components configured to store data.

In these illustrative examples, data analyzer 222 is configured to retrieve and process images 216 stored in storage system 224. As one illustrative example, data analyzer 222 may determine when the number of images 216 stored in storage system 224 reaches a selected number of images. When the number of images 216 stored reaches the selected number, data analyzer 222 may then retrieve these images for processing. The portion of images 216 retrieved by data analyzer 222 for processing forms set of images 226.

Data analyzer 222 processes set of images 226 to resolve any clusters which may be identified in set of images 226. This processing is described in greater detail in FIG. 3 below.

Figure 3:
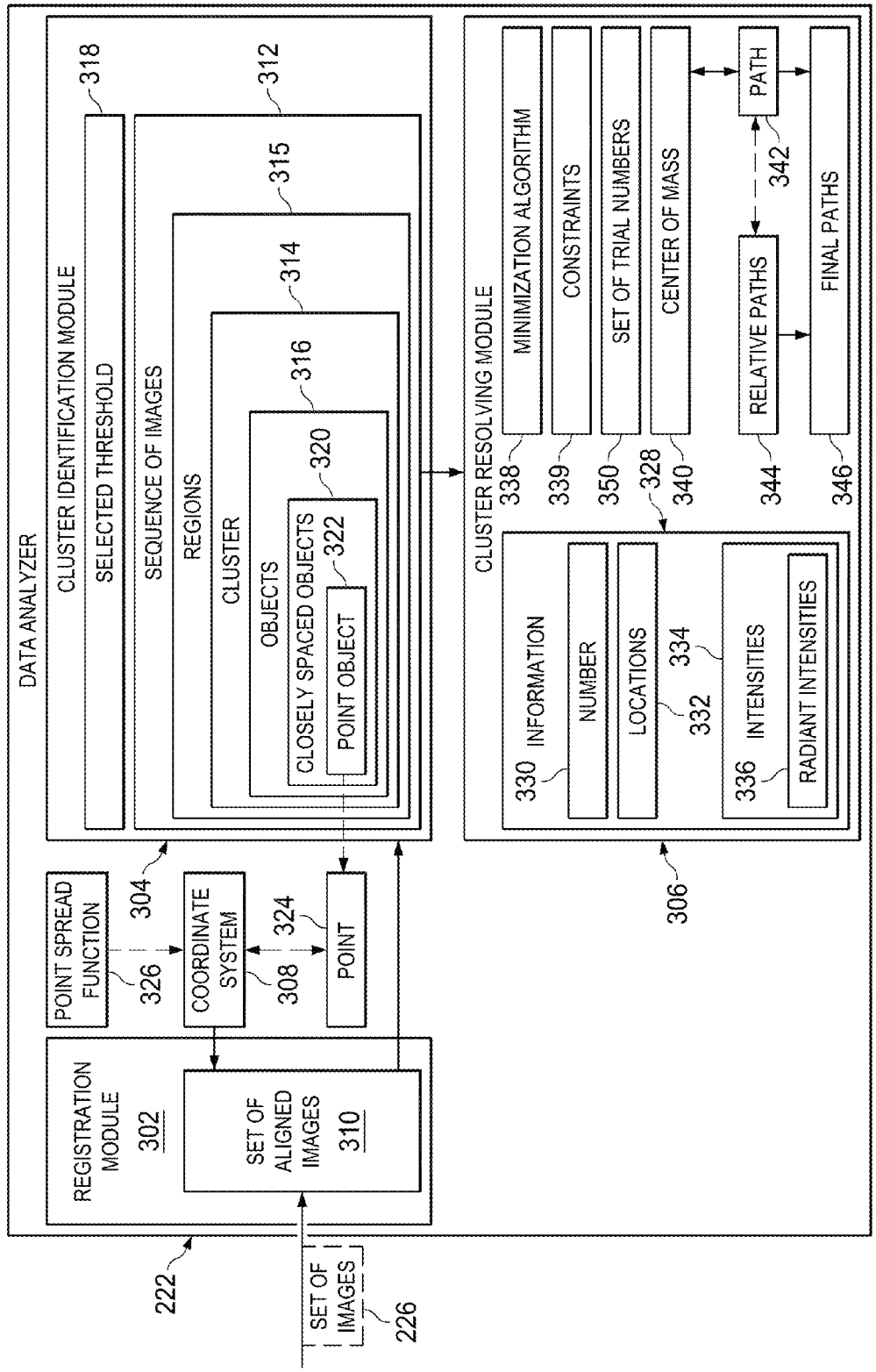
FIG. 3 is an illustration of a data analyzer in the form of a block diagram in accordance with an advantageous embodiment.

With reference now to FIG. 3, an illustration of a data analyzer in the form of a block diagram is depicted in accordance with an advantageous embodiment. Data analyzer 222 from FIG. 2 is described in greater detail in FIG. 3. In these illustrative examples, data analyzer 222 includes registration module 302, cluster identification module 304, and cluster resolving module 306.

Registration module 302 processes set of images 226 to align the images in set of images 226 to coordinate system 308 to form set of aligned images 310. As one illustrative example, registration module 302 may align features in the images in set of images 226 with respect to coordinate system 308.

When the features in the images in set of images 226 are aligned, a feature may have a location in one image in set of images 226 with respect to coordinate system 308 that is substantially the same as a location of the same feature in another image in set of images 226, with respect to coordinate system 308. These features may include background features, such as, for example, without limitation, any number of trees, clouds, bushes, roadways, land features, landmarks, man-made structures, buildings, bridges, rivers, ponds, and other suitable features.

Coordinate system 308 may take the form of an x,y-coordinate system in these illustrative examples. Coordinate system 308 may identify a pixel in an image in set of aligned images 310 using an integer for the row and an integer for the column for that pixel. In particular, these integers are assigned to the centroid of the pixel.

When sensor system 202 in FIG. 2 takes the form of a staring sensor system, features in set of images 226 may substantially align prior to processing. In other words, registration module 302 may not need to perform any processing to align set of images 226 to coordinate system 308. In this manner, set of images 226 may be used as set of aligned images 310.

For example, when sensor system 202 is a staring sensor system and has focal plane array 208 in FIG. 2, set of images 226 may be used as set of aligned images 310. In this example, each pixel in an image in set of aligned images 310 corresponds to a sensor element in sensor elements 210 in focal plane array 208. In other words, the correspondence between these pixels and sensor elements 210 is a one-to-one correspondence. In this manner, the integers that define the row and column for a pixel in an image in set of aligned images 310 are the same integers that define the row and column for a corresponding sensor element in sensor elements 210.

However, when sensor system 202 in FIG. 2 takes the form of a scanning sensor system that has focal plane array 208, features in the background of set of images 226 may not substantially align. Registration module 302 may use any number of currently available image registration techniques to align set of images 226 to coordinate system 308. Further, the reverse transformation of the transformation used to align each image in set of images 226 to coordinate system 308 may be used to determine which sensor element in sensor elements 210 corresponds to a particular pixel in an image in set of aligned images 310.

Registration module 302 sends set of aligned images 310 to cluster identification module 304 for processing. Cluster identification module 304 forms sequence of images 312 using set of aligned images 310. Sequence of images 312 includes two or more aligned images in set of aligned images 310 in which a cluster of objects, such as cluster 314 of objects 316, is detected.

In these illustrative examples, cluster 314 of objects 316 is a group of pixels in a same region of an image that represents two or more objects. The pixels that form cluster 314 may be identified using, for example, selected threshold 318 for pixel values. As one illustrative example, cluster identification module 304 may identify a pixel that has a pixel value greater than selected threshold 318 as being part of cluster 314.

Further, the images in sequence of images 312 are ordered with respect to time. The period of time between consecutive images in sequence of images 312 may be substantially the same or different between different pairs of images in sequence of images 312, depending on the implementation.

As depicted, cluster 314 may be present in regions 315 in sequence of images 312. Each region in regions 315 corresponds to an image in sequence of images 312. Regions 315 may be the same and/or different regions in sequence of images 312. For example, if objects 316 in cluster 314 are moving, cluster 314 may appear in a different region in a current image in sequence of images 312 as compared to a prior image in sequence of images 312. In this manner, regions 315 in sequence of images 312 in which cluster 314 is detected may have different sizes and/or locations with respect to coordinate system 308.

Depending on the implementation, more than one cluster may be detected in sequence of images 312. In some illustrative examples, cluster identification module 304 may identify additional sequences of images in which additional clusters are detected.

In these illustrative examples, two or more of objects 316 in cluster 314 may appear as closely spaced objects (CSOs) 320 in at least one image in sequence of images 312. Closely spaced objects 320 are objects in an image that may be unable to be resolved without further processing of the image. In other words, closely spaced objects 320 may be objects in the image that may not be individually distinguishable to the human eye.

For example, objects 316 may be point objects in these depicted examples. A point object may be any object that has a size small enough and/or a distance far enough relative to sensor system 202 in FIG. 2 such that the object may be approximated as a single point with respect to sensor system 202.

In other words, the energy from the object may be considered to originate from a single point. The energy from the object may be emitted by and/or reflected off of the object. In particular, a point object may be approximated as a mathematical point with respect to sensor system 202. A mathematical point may have negligible extent. In other words, a mathematical point may have substantially zero dimensions. A point object may also be referred to as a point source.

In these illustrative examples, an object plane is the plane that passes through an object. Further, an image plane is a plane at which images 216 generated by sensor system 202 in FIG. 2 are focused. For example, when sensor system 202 has focal plane array 208 in FIG. 2, the image plane is the focal plane for focal plane array 208. The focal plane for focal plane array 208 is the plane through sensor elements 210.

An object that is a point object may be approximated as a mathematical point of energy in the object plane that may be spread out to form a finite area in the image plane. This spreading may be from a point in the image plane corresponding to the mathematical point for the object in the object plane. Further, when the spreading for two different objects overlaps by more than some selected amount, these two objects may appear as closely spaced objects.

In these illustrative examples, point object 322 may be an example of one of objects 316 in cluster 314. Point object 322 corresponds to point 324 in coordinate system 308. In these illustrative examples, point 324 in coordinate system 308 may be defined as (x,y). The values for "x" and "y" may be integer values or non-integer values. In this manner, point 324 may be at the centroid of a pixel or located away from the centroid of the pixel.

The amount of spreading in the image plane for sensor system 202 corresponding to point object 322 is determined by point spread function 326. Point spread function 326 for point object 322 describes the response of sensor system 202 to point object 322. In particular, point spread function 326 is the image of point object 322 generated by sensor system 202.

In this manner, point spread function 326 determines which pixels in the image have a pixel value based on energy 212 from point object 322 at point 324. In other words, point spread function 326 determines the portion of the pixels around point 324 in the image that also represent point object 322.

Point spread function 326 for point object 322 may take a number of different forms, depending on the characteristics of sensor system 202. Oftentimes, the actual point spread function of a sensor system is approximated using a Gaussian point spread function. In these illustrative examples, point spread function 326 may be approximated by a Gaussian point spread function. In other words, the distribution of energy 212 for point object 322 with respect to point 324 in coordinate system 308 may be approximated by a Gaussian distribution having a peak at point 324.

As one illustrative example, when point spread function 326 has a Gaussian form, point spread function 326 at any point may be defined as follows:

$$PSF(x, y) = Ae^{-\left(\frac{((x-x_0))^2}{\frac{\sigma_x^2}{2}} + \frac{((y-y_0))^2}{\frac{\sigma_y^2}{2}}\right)} \quad (1)$$

$$\text{with } A = \frac{A'}{2\pi\sigma_x\sigma_y}, \quad (2)$$

where PSF is point spread function 326, x is the x-coordinate for the point, y is the y-coordinate for the point, $x_0$ is the x-coordinate for the peak of point spread function 326 at point 324, $y_0$ is the y-coordinate for the peak of point spread function 326 at point 324, e is the exponential function, A is the peak intensity of point spread function 326, $\sigma_x$ is the standard deviation of point spread function 326 with respect to the x-axis in coordinate system 308, $\sigma_y$ is the standard deviation of point spread function 326 with respect to the y-axis in coordinate system 308, $\pi$ is the number pi, and A' is the integral of point spread function 326 over all space in coordinate system 308 with x-coordinates and y-coordinates between negative infinity and positive infinity.

In these illustrative examples, the intensity at a pixel in an image in sequence of images 312 may be calculated by integrating point spread function 326 over the area of the pixel. When sensor system 202 has focal plane array 208 with sensor elements 210 having a one-to-one correspondence with pixels in the image, the intensity at a pixel in an image is a measure of the intensity of electromagnetic radiation detected at the corresponding sensor element in sensor elements 210 in focal plane array 208.

In these examples, the intensity at a pixel in an image in sequence of images 312 may be calculated by integrating point spread function 326 over the area of the pixel. The intensity at a pixel is defined as follows:

$$I(i,j) = \iint_{pixel\,area} PSF(x,y)dxdy, \quad (3)$$

where I is the intensity at the pixel (id), i is an integer index for the row of the pixel, j is an integer index for the column of the pixel, and pixel area is the area of the pixel (i,j). In this manner, the intensity at pixel (i,j) is calculated by integrating point spread function 326 over every point within the area for the pixel. PSF(x,y) is given by equation (1) described above.

In equation (3), the integral function may be implemented using a number of currently available techniques. For example, without limitation, direct integration, interpolation from a look-up table, and/or some other suitable technique may be used.

In some cases, the intensity of energy 212 emitted by or reflected off of point object 322 may be detected at more than one sensor element. In this manner, more than one pixel may represent point object 322.

In these illustrative examples, a radiant intensity for the object may be measured using the intensity calculated for each pixel that represents the object. A radiant intensity for an object in objects 316 is a measure of the electromagnetic radiation emitted by the object. In one illustrative example, the radiant intensity of one of objects 316 may be represented by the sum of the pixel values for the pixels that correspond to the portion of sensor elements 210 that fall within point spread function 326 for the object.

Additionally, in some cases, point spread function 326 for two or more of objects 316 in cluster 314 may overlap. For example, when two of objects 316 are closely spaced objects 320, energy 212 from these two objects may be detected at a same sensor element. As a result, distinguishing between these two objects may not be possible without further processing.

In these illustrative examples, the contributions of each object in objects 316 in cluster 314 to the electromagnetic radiation detected at a sensor element need to be taken into account when measuring the intensity at a pixel. For example, when multiple point objects are detected at focal plane array 208, the total intensity at a pixel is defined as follows:

$$I_{total}(i, j) = \sum_{k=1}^{K} I_k(i, j), \quad (4)$$

where $I_{total}(i,j)$ is the total intensity at the pixel (i,j), i is an integer index for the row of the pixel, j is an integer index for the column of the pixel, K is the total number of point objects, k is an index for each of objects 316, and $I_k(i,j)$ is the intensity contributed by the $k^{th}$ object in objects 316 at the pixel (i,j). $I_k(i,j)$ is given by equation (3) as described above.

In these illustrative examples, cluster resolving module 306 uses sequence of images 312 formed by cluster identification module 304 to resolve cluster 314. In particular, cluster resolving module 306 uses sequence of images 312 and point spread function 326 for each of objects 316 in cluster 314 to identify information 328 about objects 316.

As depicted, information 328 may include, for example, without limitation, number 330 of objects 316 in cluster 314, locations 332 of objects 316 in cluster 314 with respect to coordinate system 308, and intensities 334 for objects 316 in cluster 314. In these illustrative examples, intensities 334 are estimations of radiant intensities 336 for objects 316. Further, information 328 may include other suitable information about objects 316 in cluster 314, depending on the implementation.

Further, in these illustrative examples, cluster resolving module 306 uses sequence of images 312, minimization algorithm 338, and constraints 339 to identify information 328 about objects 316. Minimization algorithm 338 may take the form of any currently available minimization algorithm. As one illustrative example, minimization algorithm 338 may be a least-squares algorithm.

Cluster resolving module 306 runs minimization algorithm 338 using constraints 339. Constraints 339 are selected to reduce the time and number of iterations needed in running minimization algorithm 338. Constraints 339 may include, for example, without limitation, limits to the distance between an object in objects 316 and center of mass 340 for cluster 314, constraints on the direction in which an object in objects 316 may move relative to center of mass 340 for cluster 314, constraints on the range of intensities that objects 316 may have, and other suitable types of limits. Constraints 339 may be based on information identified from set of images 226 and/or other suitable information.

Center of mass 340 for cluster 314 in an image in sequence of images 312 may be a mean location for all of the pixel values for the pixels in the region in the image in which cluster 314 is detected. For example, center of mass 340 for cluster 314 in a particular region in an image in sequence of images 312 may be defined as follows:

$$x_{CMmeas}(t) = \frac{\sum_{CSOrows}\sum_{CSOcols} icol \, I_{measured}(irow, icol)}{\sum_{CSOrows}\sum_{CSOcols} I_{measured}(irow, icol)} \quad (5)$$

$$y_{CMmeas}(t) = \frac{\sum_{CSOrows}\sum_{CSOcols} irow \, I_{measured}(irow, icol)}{\sum_{CSOrows}\sum_{CSOcols} I_{measured}(irow, icol)} \quad (6)$$

where $x_{CMmeas}$ is the x-coordinate for center of mass 340 with respect to coordinate system 308, $y_{CMmeas}$ is the y-coordinate for center of mass 340 with respect to coordinate system 308, t is time, CSOrows is the rows for the pixels in the particular region, CSOcols is the columns for the pixels in the particular region, icol is an index number for a particular column, irow is an index number for a particular row, and $I_{measured}$ is a measure of the intensity at pixel (irow,icol) in the particular region in the image. In other words, when sensor system 202 has focal plane array 208 with sensor elements 210 having a one-to-one correspondence with the pixels in the image, $I_{measured}$ is a measure of the irradiance detected at the sensor element in sensor elements 210 in FIG. 2 corresponding to the pixel (irow,icol) in the particular region in the image.

Cluster resolving module 306 identifies path 342 for center of mass 340 for cluster 314 of objects 316 with respect to coordinate system 308. Path 342 is an estimation of a path along which center of mass 340 moves from image to image in sequence of images 312.

Cluster resolving module 306 also identifies relative paths 344 for objects 316 in cluster 314 with respect to coordinate system 308. A relative path in relative paths 344 for an object in objects 316 is relative to path 342 for center of mass 340 for cluster 314. In particular, relative paths 344 are estimations of the paths along which objects 316 move from image to image in sequence of images 312 relative to path 342 for center of mass 340.

Cluster resolving module 306 uses path 342 for center of mass 340 and relative paths 344 for objects 316 to identify final paths 346 for objects 316 with respect to coordinate system 308. Final paths 346 are estimations of the paths along which objects 316 move from image to image in sequence of images 312.

A final path in final paths 346 for an object in objects 316 in cluster 314 may be the sum of path 342 and the corresponding relative path in relative paths 344 for the same object. Cluster resolving module 306 may use final paths 346 for objects 316 to identify locations 332 of objects 316 with respect to coordinate system 308 at any point in time.

Cluster resolving module 306 identifies final paths 346 for objects 316 for each trial number in set of trial numbers 350 for number 330 of objects 316.

Further, cluster resolving module 306 uses minimization algorithm 338 to select one of set of trial numbers 350 as number 330 for objects 316. Each number in set of trial numbers 350 is a potential value for number 330 of objects 316 in cluster 314. As a result, number 330 is an estimation of the number of objects 316 in cluster 314.

In this manner, data analyzer 222 is configured to process set of images 226 and track the individual objects that may be present in cluster 314 detected in these images. The operations performed by cluster resolving module 306 to identify information 328 about objects 316 in cluster 314 are described in greater detail in the flowcharts in FIGS. 4, 5, and 6 below.

The illustrations of data processing environment 200 in FIG. 2 and data analyzer 222 in FIGS. 2 and 3 are not meant to imply physical or architectural limitations to the manner in which an advantageous embodiment may be implemented. Other components in addition to and/or in place of the ones illustrated may be used. Some components may be unnecessary. Also, the blocks are presented to illustrate some functional components. One or more of these blocks may be combined, divided, or combined and divided into different blocks when implemented in an advantageous embodiment.

For example, in some illustrative examples, one or more of data manager 220 and data analyzer 222 may be implemented in a computer system in sensor system 202 in FIG. 2. In other illustrative examples, sensor system 202 may not be associated with platform 206. For example, sensor system 202 may be configured to send sensor data 214 to data processing system 204 that is associated with platform 206. In some illustrative examples, sensor system 202 may not include focal plane array 208.

In still other illustrative examples, data manager 220 and/or storage system 224 may not be present in data processing system 204. For example, data analyzer 222 may be configured to receive frames 215 of sensor data 214 directly from sensor system 202.

Further, in some illustrative examples, data analyzer 222 may be configured to process frames 215 of sensor data 214 as frames 215 are received instead of waiting until the selected number of frames for sequence of images 312 has been received. For example, data analyzer 222 may process each new frame of sensor data 214 received along with previously identified final paths 346 for objects 316 to further refine final paths 346 identified for objects 316.

Figure 4:
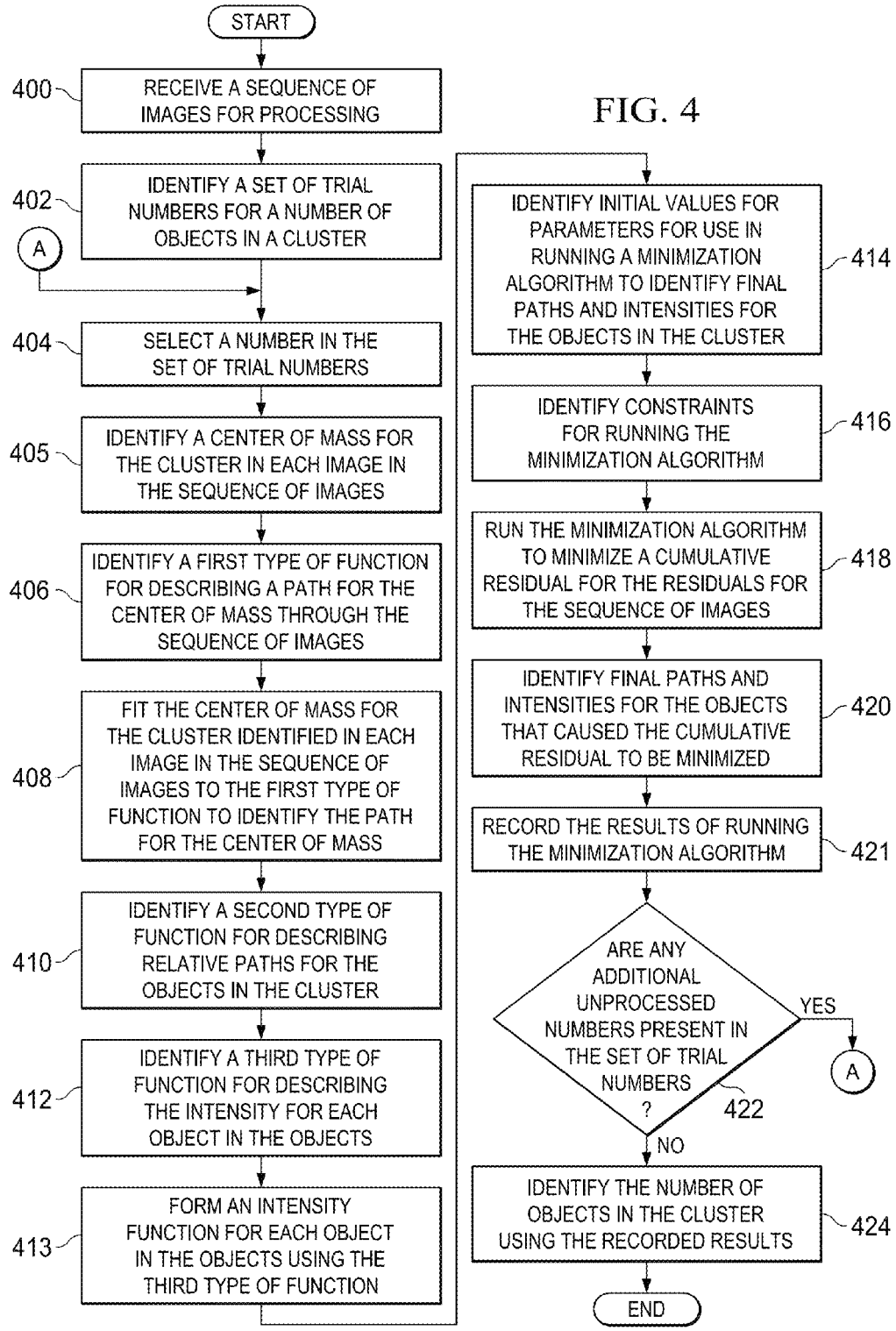
FIG. 4 is an illustration of a process for identifying information about a cluster of objects in the form of a flowchart in accordance with an advantageous embodiment.

With reference now to FIG. 4, an illustration of a process for identifying information about a cluster of objects in the form of a flowchart is depicted in accordance with an advantageous embodiment. The process illustrated in FIG. 4 may be implemented using data processing system 204 in FIG. 2. In particular, this process may be implemented using cluster resolving module 306 in data analyzer 222 in FIG. 3. Further, this process may be implemented to resolve cluster 314 detected in sequence of images 312 in FIG. 3.

The process may begin by receiving sequence of images 312 for processing (operation 400). Cluster 314 has been detected in each image in sequence of images 312 in this illustrative example. The process then identifies set of trial numbers 350 for number 330 of objects 316 in cluster 314 (operation 402). Set of trial numbers 350 may include, for example, without limitation, the numbers 2, 3, and 4. As another example, set of trial numbers 350 may include the numbers 2, 3, 4, 5, and 6.

Thereafter, the process selects a number in set of trial numbers 350 (operation 404). The process then identifies center of mass 340 for cluster 314 in each image in sequence of images 312 (operation 405). Next, the process identifies a first type of function for describing path 342 for center of mass 340 through sequence of images 312 (operation 406). The first type of function may be, for example, without limitation, a first-order polynomial function, a second-order polynomial function, a third-order polynomial function, a sinusoidal function, some other suitable type of function, or a combination thereof.

As one illustrative example, the first type of function may be a second-order polynomial function. A second-order polynomial function may be used to describe path 342 for center of mass 340 with respect to an x-axis in coordinate system 308 and a y-axis in coordinate system 308.

For example, the x-coordinate and the y-coordinate for center of mass 340 for cluster 314 with respect to coordinate system 308 at any point in time along path 342 may be described using the form of a second-order polynomial function as follows:

$$x_{CM}(t) = x_{0CM} + x_{1CM}(t-t_C) + x_{2CM}(t-t_C)^2 \quad (7)$$

$$y_{CM}(t) = y_{0CM} + y_{1CM}(t-t_C) + y_{2CM}(t-t_C)^2 \quad (8)$$

where $x_{CM}$ is the x-coordinate for center of mass 340 with respect to coordinate system 308; $y_{CM}$ is the y-coordinate for center of mass 340 with respect to coordinate system 308; t is time; $t_c$ is an offset time; $x_{0CM}$, $x_{1CM}$, and $x_{2CM}$ are the coefficients for the second-order polynomial function with respect to the x-coordinate; and $y_{0CM}$, $y_{1CM}$, and $y_{2CM}$ are the coefficients for the second-order polynomial function with respect to the y-coordinate. In this illustrative example, the offset time, $t_c$, may be an estimated middle or center time in the times represented by sequence of images 312.

The process then fits center of mass 340 for cluster 314 identified in each image in sequence of images 312 to the first type of function to identify path 342 for center of mass 340 (operation 408). In other words, in operation 408, the process identifies path 342 for center of mass 340 such that path 342 has a substantially same form as the first type of function.

In operation 408, the process identifies the coefficients $x_{0CM}$, $x_{1CM}$, $x_{2CM}$, $y_{0CM}$, $y_{1CM}$, and $y_{2CM}$ that fit center of mass 340 identified in each image in sequence of images 312 within selected tolerances. In this manner, an x-coordinate and a y-coordinate for center of mass 340 may be estimated at any point in time.

The process then identifies a second type of function for describing relative paths 344 for objects 316 in cluster 314 (operation 410). The second type of function may be, for example, without limitation, a first-order polynomial function, a second-order polynomial function, a third-order polynomial function, a sinusoidal function, some other suitable type of function, or a combination thereof. Depending on the implementation, the second type of function identified in operation 410 may be the same as or different from the first type of function identified in operation 406.

As one illustrative example, the second type of function may be a second-order polynomial function. A second-order polynomial function may be used to describe a relative path in relative paths 344 for an object in objects 316 with respect to an x-axis in coordinate system 308 and a y-axis in coordinate system 308.

For example, the x-coordinate and the y-coordinate for an object in objects 316 relative to center of mass 340 with respect to coordinate system 308 at any point in time along the relative path for the object may be described using the form of a second-order polynomial function as follows:

$$x_{rk}(t) = x_{0k} + x_{1k}(t-t_C) + x_{2k}(t-t_C)^2 \quad (9)$$

$$y_{rk}(t) = y_{0k} + y_{1k}(t-t_C) + y_{2k}(t-t_C)^2 \quad (10)$$

where $x_{rk}$ is the x-coordinate for the $k^{th}$ object relative to center of mass 340 with respect to coordinate system 308; $y_{rk}$ is the y-coordinate for the $k^{th}$ object relative to center of mass 340 with respect to coordinate system 308; t is time; $t_c$ is the offset time; $x_{0k}$, $x_{1k}$, and $x_{2k}$ are the coefficients for the second-order polynomial function with respect to the x-coordinate; and $y_{0k}$, $y_{1k}$, and $y_{2k}$ are coefficients for the second-order polynomial function with respect to the y-coordinate. In this manner, equations (9) and (10) describe the relative path for the $k^{th}$ object relative to path 342 for center of mass 340.

The process then identifies a third type of function for describing the intensity for each object in objects 316 (operation 412). The third type of function may be the same or different for the different objects in objects 316. The third type of function may take a number of different forms. In one illustrative example, the third type of function for the intensity for the $k^{th}$ object may include a linear slope with a superimposed periodic oscillation.

The process forms an intensity function for each object in objects 316 using the third type of function (operation 413). For example, the intensity function for an object may be described using the form of the third type of function as follows:

$$I_k(t) = I_{0k} + I_{1k}(t-t_C) + B_k \cos(2\pi f_k(t-t_C) + \phi_k) \quad (11)$$

where $I_k(t)$ is the intensity for the $k^{th}$ object at time t, $t_c$ is the offset time, $I_{0k}$ and $I_{1k}$ are coefficients for the intensity function, $B_k$ is an amplitude for an oscillation for the $k^{th}$ object, $\pi$ is pi, $f_k$ is a frequency of the oscillation for the $k^{th}$ object, and $\phi_k$ is the phase of the oscillation for the $k^{th}$ object. One or more of the terms in equation (11) may be truncated as needed to correspond to the radiant intensity detected at sensor elements 210 in focal plane array 208 in FIG. 2. Of course, in other illustrative examples, the third type of function may take some other form.

Next, the process identifies initial values for parameters for use in running minimization algorithm 338 to identify final paths 346 and intensities 334 for objects 316 in cluster 314 (operation 414). In operation 414, a portion of these parameters may be the coefficients used for identifying final paths 346. In this illustrative example, a final path in final paths 346 for an object in objects 316 is the sum of path 342 for center of mass 340 and the relative path in relative paths 344 for the object. The coefficients for final paths 346 initialized may be the coefficients for relative paths 344 for the object. The coefficients for relative paths 344 for objects 316 may be set to the initial value of zero.

For example, the x-coordinate and the y-coordinate for an object in objects 316 with respect to coordinate system 308 at any point in time may be described as follows:

$$x_k(t) = x_{0CM} + x_{1CM}(t-t_C) + x_{2CM}(t-t_C)^2 + x_{0k} + x_{1k}(t-t_C) + x_{2k}(t-t_C)^2 \quad (12)$$

$$y_k(t) = y_{0CM} + y_{1CM}(t-t_C) + y_{2CM}(t-t_C)^2 + y_{0k} + y_{1k}(t-t_C) + y_{2k}(t-t_C)^2 \quad (13)$$

where $x_k$ is the x-coordinate for the $k^{th}$ object with respect to coordinate system 308 and $y_k$ is the y-coordinate for the $k^{th}$ object with respect to coordinate system 308. In this manner, equations (12) and (13) describe the final path for the $k^{th}$ object. In operation 414, $x_{0k}$, $x_{1k}$, $x_{2k}$, $y_{0k}$, $y_{1k}$, and $y_{2k}$ may be initialized to zero for use in minimization algorithm 338.

Further, in operation 414, a portion of the parameters may be the coefficients in equation (11). In particular, these coefficients, $I_{0k}$ and $I_{1k}$, may be initialized to values estimated based on an evaluation of cluster 314.

Still further, the parameters initialized in operation 414 may include a number of parameters for point spread function 326. In particular, in operation 414, when point spread function 326 is a Gaussian function, the standard deviation, $\sigma$, of point spread function 326 may be used as a parameter in minimization algorithm 338. For example, the standard deviation of point spread function 326 with respect to the x-axis in coordinate system 308, $\sigma_x$, and the standard deviation of point spread function 326 with respect to the y-axis in coordinate system 308, $\sigma_y$, are estimated.

Thereafter, the process identifies constraints 339 for running minimization algorithm 338 (operation 416). As described above, constraints 339 may include, for example, without limitation, limits to the distance between an object in objects 316 and center of mass 340 for cluster 314, constraints on the direction in which an object in objects 316 may move relative to center of mass 340 for cluster 314, constraints on the range of intensities 334 that objects 316 in cluster 314 may have, and other suitable types of limits. Additionally, constraints 339 may include limits for varying the number of parameters for point spread function 326 when running minimization algorithm 338.

The process then runs minimization algorithm 338 to minimize a cumulative residual for the residuals for sequence of images 312 (operation 418). The cumulative residual may be the sum of residuals calculated for each image in sequence of images 312. The residual for a particular image in sequence of images is the difference between information 328 estimated for objects 316 in cluster 314 with respect to that image and the actual values for this information.

For example, the residual for an image in sequence of images 312 may be the difference between intensities 334 calculated for objects 316 in cluster 314 in that image and the actual intensities measured at the corresponding sensor elements in sensor elements 210. The corresponding sensor elements are the sensor elements that correspond to the pixels in the image representing objects 316. Intensities 334 are the intensities for objects 316 that may be calculated using the intensity function identified in operation 412 as described above.

In particular, the residual for an image in sequence of images 312 may be defined as follows:

$$R_b = \frac{\Sigma(I_{measured}(i,j,b) - I_{total}(i,j,b))^2}{Npix_b}, \quad (14)$$

where b is an index for the images in sequence of images 312, $R_b$ is a residual for the $b^{th}$ image in sequence of images 312, $I_{measured}(i,j,b)$ is the measured intensity at the pixel (i,j) in the $b^{th}$ image, $I_{total}(i,j,b)$ is the intensity calculated for the pixel (i,j) at the $b^{th}$ image using equation (11) and equation (4), and $Npix_b$ is the total number of pixels in the region in which cluster 314 is detected in the $b^{th}$ image. Further, in equation (14), the sum, $\Sigma$, is over all of the pixels in the region in which cluster 314 is detected.

Next, the process identifies final paths 346 and intensities 334 for objects 316 (operation 420). In operation 420, final paths 346 are identified using relative paths 344 identified from running minimization algorithm 338.

The process records the results of running minimization algorithm 338 (operation 421). The process determines whether any additional unprocessed numbers in set of trial numbers 350 are present (operation 422). If additional unprocessed numbers are present, the process returns to operation 404 as described above. In returning to operation 404, in these illustrative examples, the next number in set of trial numbers 350 that is higher may be selected. In this manner, each number in set of trial numbers 350 may be processed in a sequentially ordered manner.

With reference again to operation 422, if additional unprocessed numbers in set of trial numbers 350 are not present, the process identifies number 330 of objects 316 in cluster 314 using the recorded results (operation 424), with the process terminating thereafter. In operation 424, number 330 is identified using the cumulative residual calculated for each number in set of trial numbers 350.

Typically, the cumulative residuals for the numbers in set of trial numbers 350 that are less than the correct number of objects 316 will be greater than the cumulative residual calculated for the number in set of trial numbers 350 that is the correct number of objects 316. Further, the cumulative residuals for the numbers in set of trial numbers 350 that are greater than the correct number of objects 316, typically, will be substantially equal to or greater than the cumulative residual calculated for the number in set of trial numbers 350 that is the correct number of objects 316.

As a result, the correct number of objects 316 may be determined by identifying the number in set of trial numbers 350 at which the cumulative residuals that are calculated reach a first minimum value. In this manner, number 330 of objects 316 is an estimation of the actual number of objects 316 in cluster 314.

Figure 5:
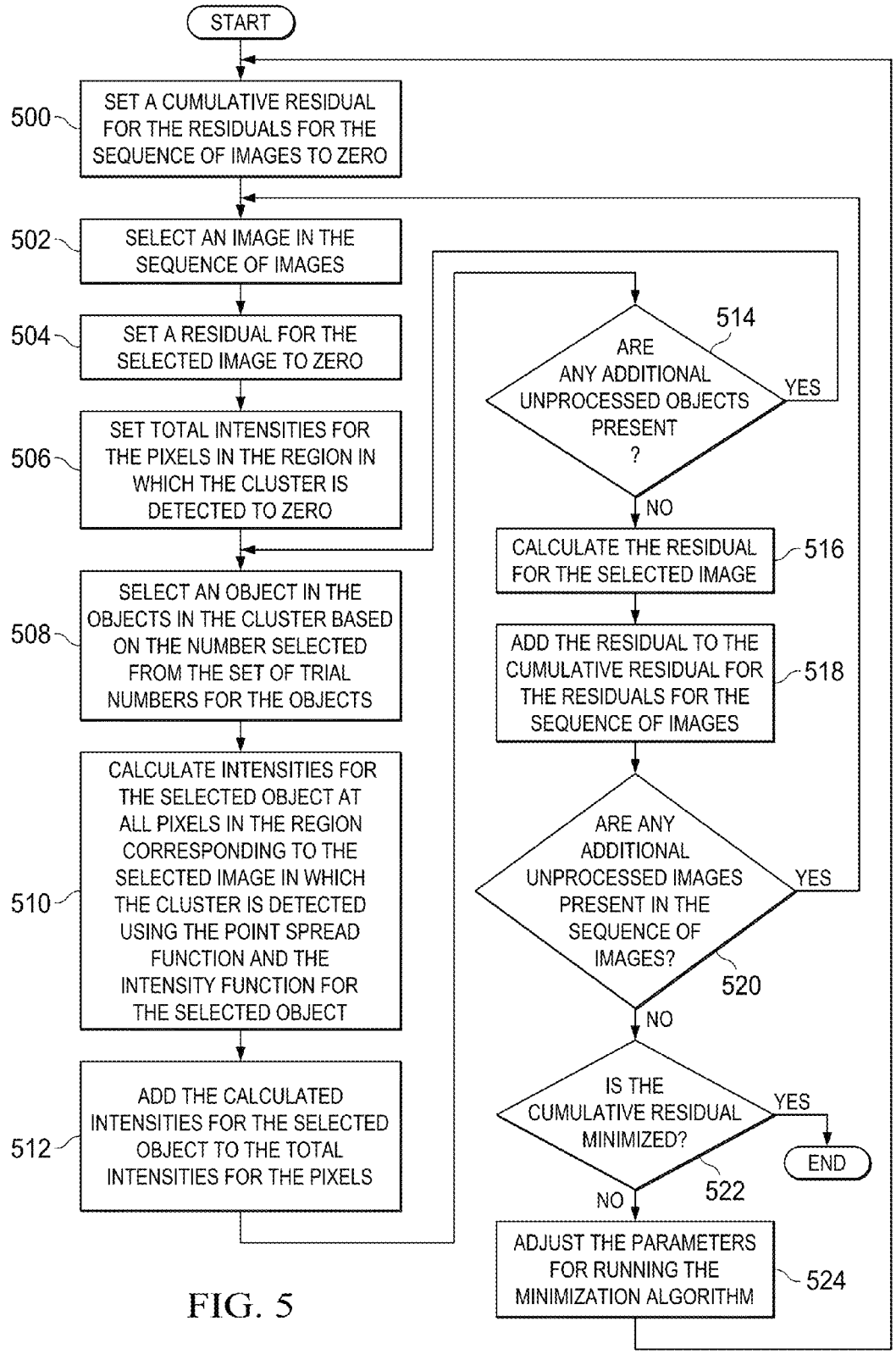
FIG. 5 is an illustration of a process for running a minimization algorithm in the form of a flowchart in accordance with an advantageous embodiment.

With reference now to FIG. 5, an illustration of a process for running a minimization algorithm in the form of a flowchart is depicted in accordance with an advantageous embodiment. The process illustrated in FIG. 5 may be used to implement operation 418 in FIG. 4.

The process begins by setting a cumulative residual for the residuals for sequence of images 312 to zero (operation 500). The process then selects an image in sequence of images 312 (operation 502). The process sets a residual for the selected image to zero (operation 504). Further, the process sets total intensities for the pixels in the region in which cluster 314 is detected to zero (operation 506). A total intensity is present for each pixel in the region.

The total intensity at a pixel is defined by equation (4) as described above. Further, the total intensity at a pixel is based on a sum of point spread function 326 for each object in objects 316 in cluster 314 integrated over the pixel. The value of point spread function 326 integrated over a pixel for each object depends on the parameters of point spread function 326 as described above.

In this manner, the total intensity at the pixel depends on locations 332 and intensities 334 for objects 316 in the selected image given by relative paths 344 for objects 316, path 342 for center of mass 340, and intensities 334 for objects 316. Relative paths 344 for objects 316, intensities 334 for objects 316, and point spread function 326 may be estimated simultaneously by minimization algorithm 338.

Thereafter, the process selects an object in objects 316 in cluster 314 based on the number selected from set of trial numbers 350 for objects 316 (operation 508). The number selected from set of trial numbers 350 is the number selected in operation 404 as described above. For example, if the number selected from set of trial numbers 350 is 3, then 3 objects are assumed to be in cluster 314. One of these 3 objects is selected in operation 508.

Next, the process calculates intensities 334 for the selected object at all pixels in the region corresponding to the selected image in which cluster 314 is detected using point spread function 326 and the intensity function for the selected object (operation 510). In operation 510, this region is a region in regions 315 that corresponds to the selected image in sequence of images 312. Further, in operation 510, the intensity function may be given by equation (11) as described above.

The process then adds the calculated intensities 334 for the selected object to the total intensities for the pixels (operation 512). The process determines whether any additional unprocessed objects are present (operation 514). If additional unprocessed objects are present, the process returns to operation 508 as described above.

Otherwise, the process calculates the residual for the selected image (operation 516). In operation 516, the process calculates the residual as the difference between the measured intensities at all pixels in the region in the selected image and the total intensities calculated for the pixels. The residual for the selected image is given by equation (14) as described above.

Thereafter, the process adds the residual to the cumulative residual for the residuals for sequence of images 312 (operation 518). Next, the process determines whether any additional unprocessed images are present in sequence of images 312 (operation 520). If additional unprocessed images are present, the process returns to operation 502 as described above.

Otherwise, the process determines whether the cumulative residual has been minimized (operation 522). The cumulative residual is minimized when the difference between the calculated and measured total intensities for the pixels for all of the images in sequence of images 312 has a minimum value. The parameters for relative paths 344 and intensities 334 for objects that cause the cumulative residual to be minimized may be used in identifying final paths 346 for objects 316.

If the cumulative residual has not been minimized, the process adjusts the parameters for running minimization algorithm 338 (operation 524). In some illustrative examples, constraints 339 for minimization algorithm 338 may be adjusted in operation 524. Thereafter, the process returns to operation 500 as described above.

With reference again to operation 522, if the cumulative residual has been minimized, the process then terminates. In particular, the process terminates and proceeds to operation 420 in FIG. 4. In operation 420 in FIG. 4, the results recorded may include, for example, without limitation, the fitted parameters, the cumulative residual, a covariance matrix for the fitted parameters, final paths 346, intensities 334, and other suitable information.

Figure 6:
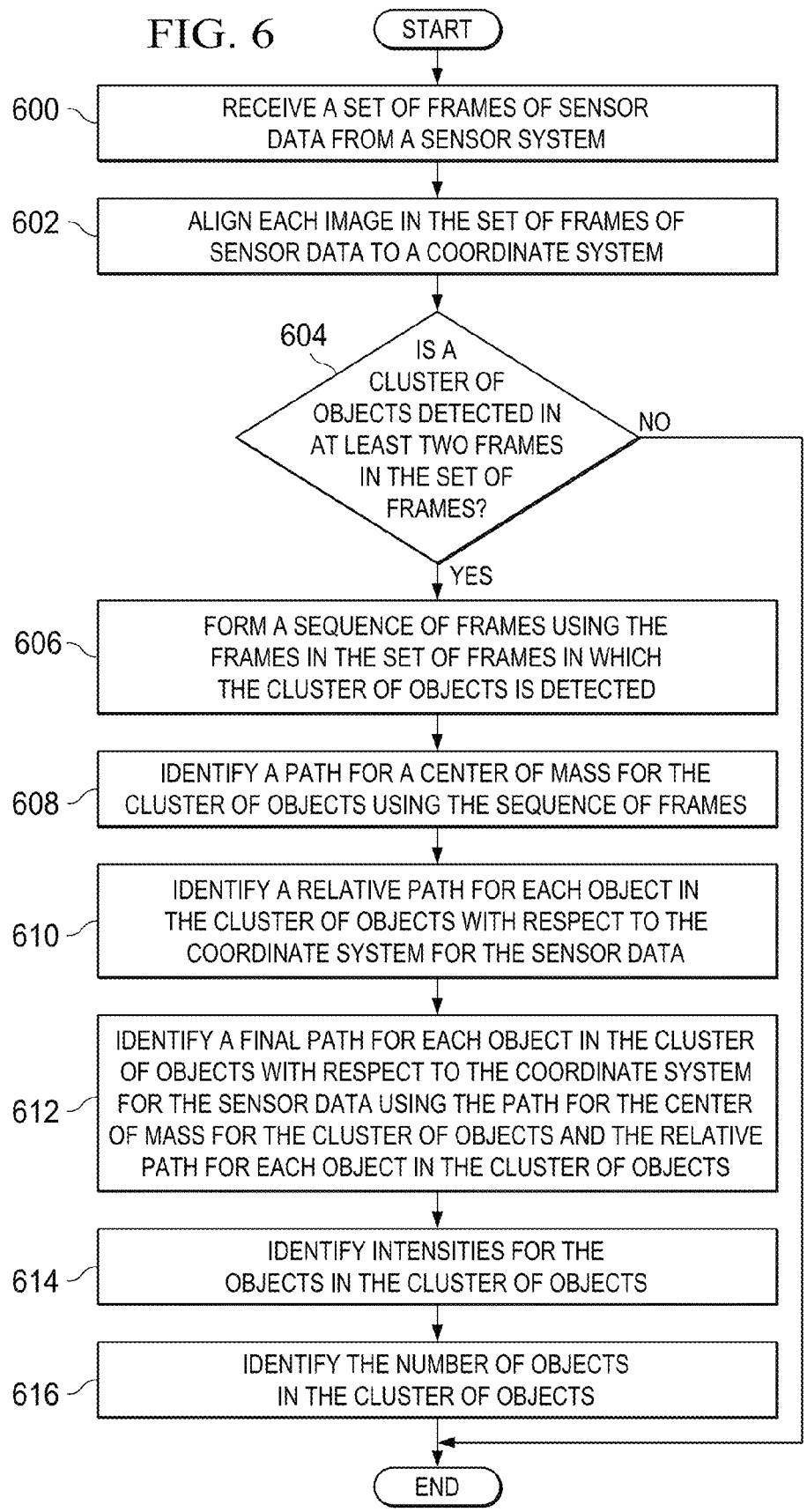
FIG. 6 is an illustration of a process for identifying information about a cluster of objects using sensor data in the form of a flowchart in accordance with an advantageous embodiment.

With reference now to FIG. 6, an illustration of a process for identifying information about a cluster of objects using sensor data in the form of a flowchart is depicted in accordance with an advantageous embodiment. The process illustrated in FIG. 6 may be implemented using data processing system 204 in FIG. 2. In particular, this process may be implemented using data analyzer 222 in FIG. 2.

The process begins by receiving a set of frames of sensor data from a sensor system (operation 600). In one illustrative example, the sensor system may take the form of sensor system 202 having focal plane array 208 in FIG. 2. The set of frames may be, for example, set of images 226 in FIG. 2, generated using sensor system 202 in FIG. 2.

The process then aligns each image in the set of frames of sensor data to a coordinate system (operation 602). Operation 602 may be performed by, for example, registration module 302 in FIG. 3. Further, in operation 602, the coordinate system may be, for example, coordinate system 308 in FIG. 3. When the set of frames takes the form of set of images 226, operation 602 may be performed to form set of aligned images 310 in FIG. 3.

Thereafter, the process determines whether a cluster of objects is detected in at least two frames in the set of frames (operation 604). Operation 604 may be performed by, for example, cluster identification module 304 in FIG. 3. If a cluster of objects is not detected in at least two frames in the set of frames, the process terminates.

Otherwise, the process forms a sequence of frames using the frames in the set of frames in which the cluster of objects is detected (operation 606). In particular, each frame in which the cluster of objects is detected is selected for the sequence of frames.

Thereafter, the process identifies a path for a center of mass for the cluster of objects using the sequence of frames (operation 608). The path is identified with respect to a coordinate system for the sensor data. Next, the process identifies a relative path for each object in the cluster of objects with respect to the coordinate system for the sensor data (operation 610). The relative path is relative to the path for the center of mass for the cluster of objects.

Thereafter, the process identifies a final path for each object in the cluster of objects with respect to the coordinate system for the sensor data using the path for the center of mass for the cluster of objects and the relative path for each object in the cluster of objects (operation 612). In operation 612, the final path for an object is identified by summing the path for the center of mass and the relative path identified for the object.

The process then identifies intensities for the objects in the cluster of objects (operation 614). The intensities for the objects may be estimations of the radiant intensities for the objects. Thereafter, the process identifies the number of objects in the cluster of objects (operation 616), with the process terminating thereafter.

The flowcharts and block diagrams in the different depicted embodiments illustrate the architecture, functionality, and operation of some possible implementations of apparatuses and methods in an advantageous embodiment. In this regard, each block in the flowcharts or block diagrams may represent a module, segment, function, and/or a portion of an operation or step. For example, one or more of the blocks may be implemented as program code, in hardware, or a combination of the program code and hardware. When implemented in hardware, the hardware may, for example, take the form of integrated circuits that are manufactured or configured to perform one or more operations in the flowcharts or block diagrams.

In some alternative implementations of an advantageous embodiment, the function or functions noted in the block may occur out of the order noted in the figures. For example, in some cases, two blocks shown in succession may be executed substantially concurrently, or the blocks may sometimes be performed in the reverse order, depending upon the functionality involved. Also, other blocks may be added in addition to the illustrated blocks in a flowchart or block diagram.

Figure 7:
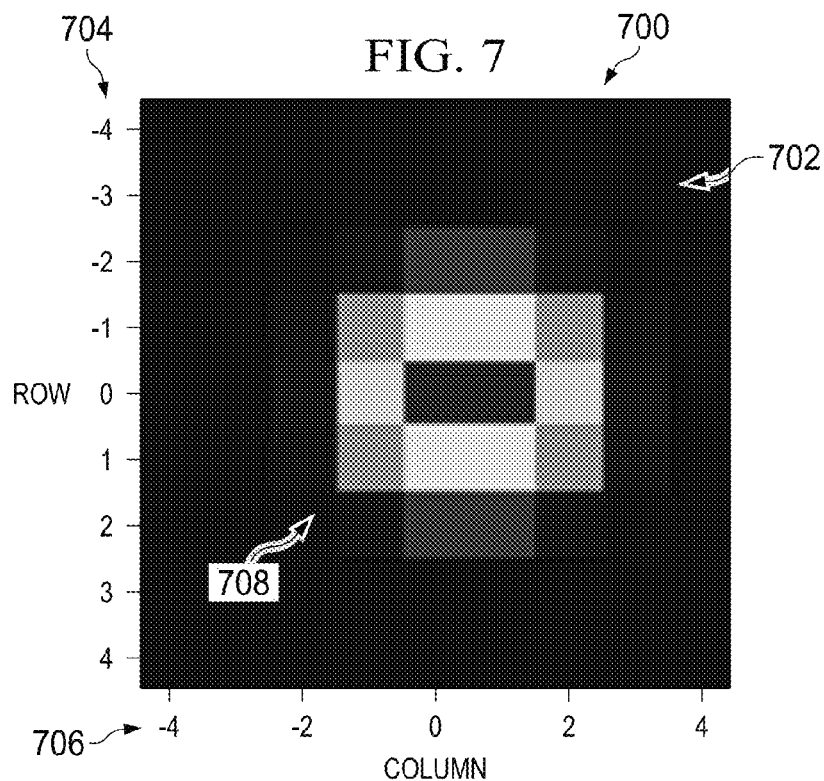
FIG. 7 is an illustration of a focal plane image in accordance with an advantageous embodiment.

Turning now to FIG. 7, an illustration of a focal plane image is depicted in accordance with an advantageous embodiment. In this illustrative example, focal plane image 700 is an example of one of images 216 in FIG. 2. Focal plane image 700 is one image in a sequence of images. Focal plane image 700 may be generated at a first time.

As depicted, focal plane image 700 has pixels 702 arranged in rows 704 and columns 706. Further, cluster 708 is present in focal plane image 700. The number of objects present in cluster 708 in focal plane image 700 and/or information about the objects in cluster 708 may not be readily apparent to the human eye. However, data processing system 204 in FIG. 2 may be used to process focal plane image 700 along with the other images in the sequence of images to identify information about the objects in cluster 708.

Figure 8:
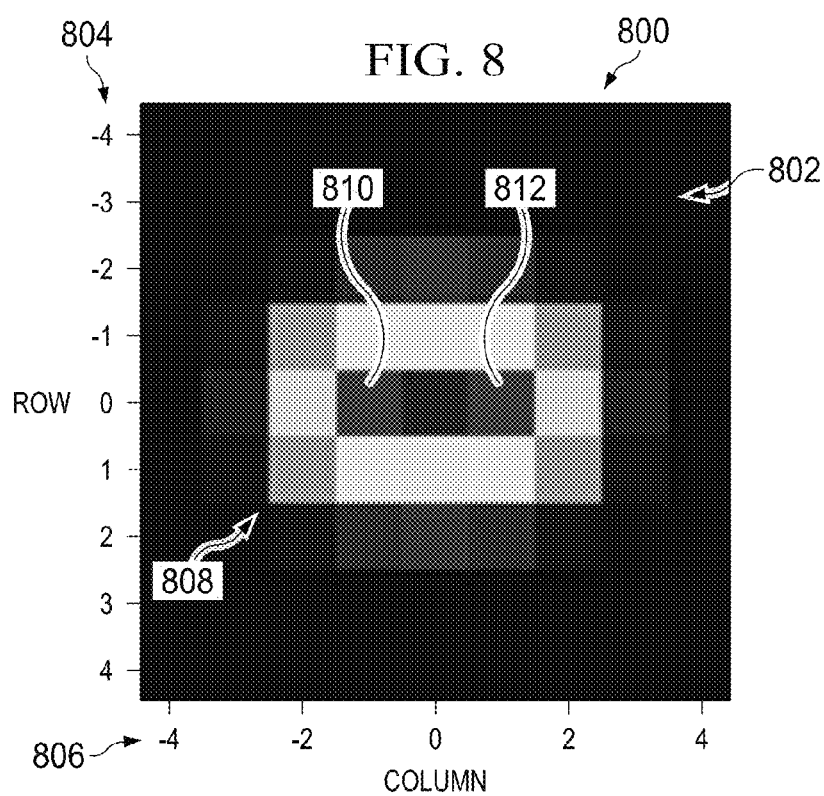
FIG. 8 is an illustration of a focal plane image in accordance with an advantageous embodiment.

Turning now to FIG. 8, an illustration of a focal plane image is depicted in accordance with an advantageous embodiment. In this illustrative example, focal plane image 800 is an example of one of images 216 in FIG. 2. In particular, focal plane image 800 is another image in the same sequence of images as focal plane image 700 in FIG. 7. Focal plane image 800 may be generated at a second time that is later than the first time at which focal plane image 700 is generated.

As depicted, focal plane image 800 has pixels 802 arranged in rows 804 and columns 806. Further, cluster 808 is present in focal plane image 800. In this illustrative example, cluster 808 includes the same objects present in cluster 706 in FIG. 7. However, in this figure, the objects in cluster 808 are distinguishable. As depicted, cluster 808 includes first object 810 and second object 812. Data processing system 204 in FIG. 2 may use the entire sequence of images that includes focal plane image 700 and focal plane image 800 to track the movement of first object 810 and second object 812 in the sequence of images.

In other illustrative examples, the sequence of images processed by data processing system 204 in FIG. 2 may not include any images in which individual objects are readily distinguishable. For example, data processing system 204 in FIG. 2 may be able to process the sequence of images that includes focal plane image 700 to track the movement of first object 810 and second object 812 without needing focal plane image 800.

Figure 9:
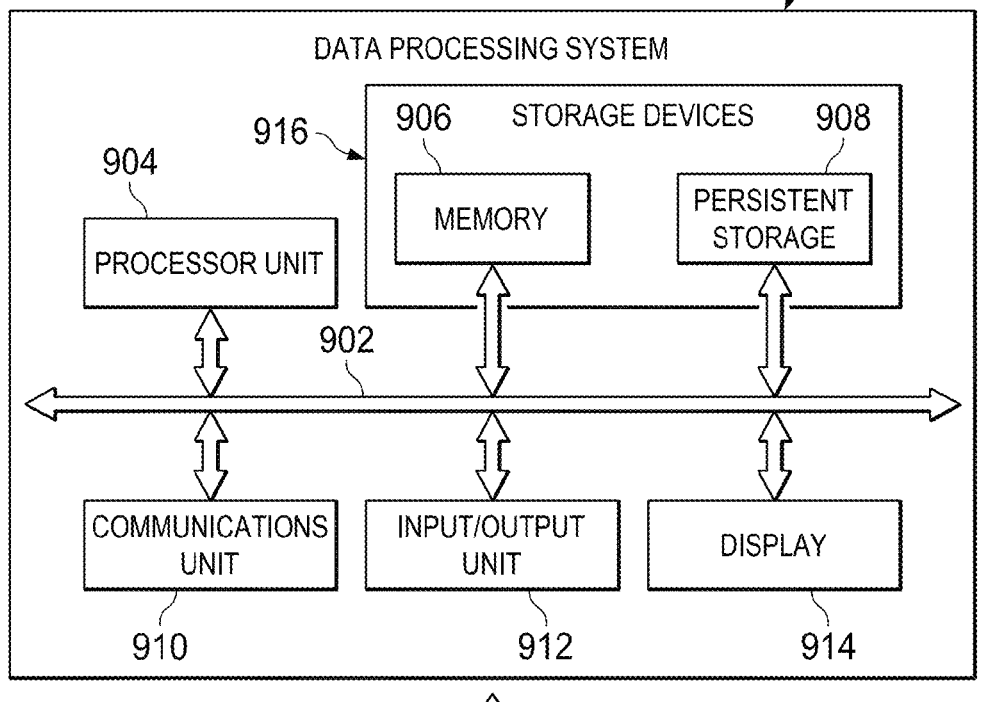
FIG. 9 is an illustration of a data processing system in accordance with an advantageous embodiment.
Figure 9:
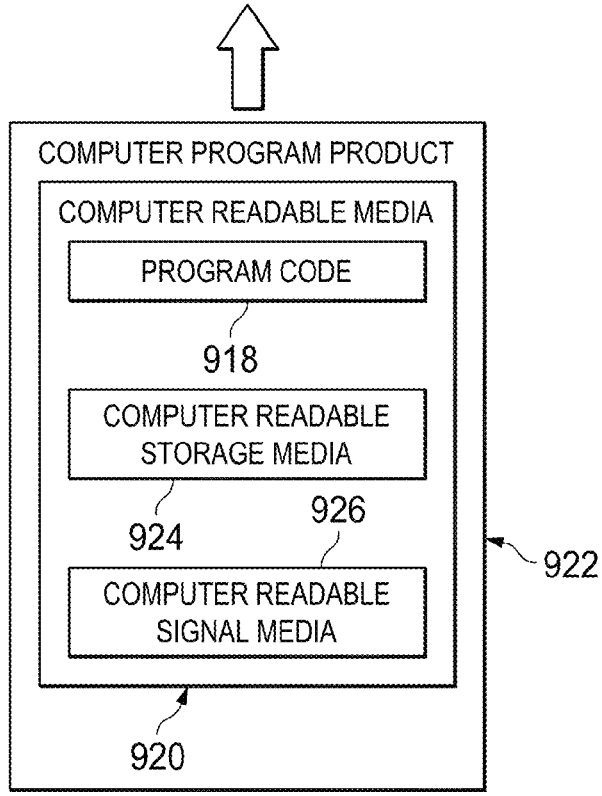

Turning now to FIG. 9, an illustration of a data processing system is depicted in accordance with an advantageous embodiment. Data processing system 900 is an example of one implementation for data processing system 204 in FIG. 2. In this illustrative example, data processing system 900 includes communications framework 902, which provides communications between processor unit 904, memory 906, persistent storage 908, communications unit 910, input/output (I/O) unit 912, and display 914.

Processor unit 904 serves to execute instructions for software that may be loaded into memory 906. Processor unit 904 may be a number of processors, a multi-processor core, or some other type of processor, depending on the particular implementation. Further, processor unit 904 may be implemented using a number of heterogeneous processor systems in which a main processor is present with secondary processors on a single chip. As another illustrative example, processor unit 904 may be a symmetric multi-processor system containing multiple processors of the same type.

Memory 906 and persistent storage 908 are examples of storage devices 916. A storage device is any piece of hardware that is capable of storing information, such as, for example, without limitation, data, program code in functional form, and other suitable information either on a temporary basis or a permanent basis.

Storage devices 916 also may be referred to as computer readable storage devices in these examples. Memory 906, in these examples, may be, for example, a random access memory or any other suitable volatile or non-volatile storage device. Persistent storage 908 may take various forms, depending on the particular implementation.

For example, persistent storage 908 may contain one or more components or devices. For example, persistent storage 908 may be a hard drive, a flash memory, a rewritable optical disk, a rewritable magnetic tape, or some combination of the above. The media used by persistent storage 908 also may be removable. For example, a removable hard drive may be used for persistent storage 908.

Communications unit 910, in these examples, provides for communications with other data processing systems or devices. In these examples, communications unit 910 is a network interface card. Communications unit 910 may provide communications through the use of either or both physical and wireless communications links.

Input/output unit 912 allows for input and output of data with other devices that may be connected to data processing system 900. For example, input/output unit 912 may provide a connection for user input through a keyboard, a mouse, and/or some other suitable input device. Further, input/output unit 912 may send output to a printer. Display 914 provides a mechanism to display information to a user.

Instructions for the operating system, applications, and/or programs may be located in storage devices 916, which are in communication with processor unit 904 through communications framework 902. In these illustrative examples, the instructions are in a functional form on persistent storage 908. These instructions may be loaded into memory 906 for execution by processor unit 904. The processes of the different embodiments may be performed by processor unit 904 using computer-implemented instructions, which may be located in a memory, such as memory 906.

These instructions are referred to as program code, computer usable program code, or computer readable program code that may be read and executed by a processor in processor unit 904. The program code in the different embodiments may be embodied on different physical or computer readable storage media, such as memory 906 or persistent storage 908.

Program code 918 is located in a functional form on computer readable media 920 that is selectively removable and may be loaded onto or transferred to data processing system 900 for execution by processor unit 904. Program code 918 and computer readable media 920 form computer program product 922 in these examples. In one example, computer readable media 920 may be computer readable storage media 924 or computer readable signal media 926. Computer readable storage media 924 may include, for example, an optical or magnetic disk that is inserted or placed into a drive or other device that is part of persistent storage 908 for transfer onto a storage device, such as a hard drive, that is part of persistent storage 908. Computer readable storage media 924 also may take the form of a persistent storage, such as a hard drive, a thumb drive, or a flash memory, that is connected to data processing system 900. In some instances, computer readable storage media 924 may not be removable from data processing system 900.

In these examples, computer readable storage media 924 is a physical or tangible storage device used to store program code 918 rather than a medium that propagates or transmits program code 918. Computer readable storage media 924 is also referred to as a computer readable tangible storage device or a computer readable physical storage device. In other words, computer readable storage media 924 is a media that can be touched by a person.

Alternatively, program code 918 may be transferred to data processing system 900 using computer readable signal media 926. Computer readable signal media 926 may be, for example, a propagated data signal containing program code 918. For example, computer readable signal media 926 may be an electromagnetic signal, an optical signal, and/or any other suitable type of signal. These signals may be transmitted over communications links, such as wireless communications links, optical fiber cable, coaxial cable, a wire, and/or any other suitable type of communications link. In other words, the communications link and/or the connection may be physical or wireless in the illustrative examples.

In some advantageous embodiments, program code 918 may be downloaded over a network to persistent storage 908 from another device or data processing system through computer readable signal media 926 for use within data processing system 900. For instance, program code stored in a computer readable storage medium in a server data processing system may be downloaded over a network from the server to data processing system 900. The data processing system providing program code 918 may be a server computer, a client computer, or some other device capable of storing and transmitting program code 918.

The different components illustrated for data processing system 900 are not meant to provide physical or architectural limitations to the manner in which different embodiments may be implemented. The different advantageous embodiments may be implemented in a data processing system including components in addition to or in place of those illustrated for the data processing system 900. Other components shown in FIG. 9 can be varied from the illustrative examples shown. The different embodiments may be implemented using any hardware device or system capable of running program code. As one example, the data processing system may include organic components integrated with inorganic components and/or may be comprised entirely of organic components excluding a human being. For example, a storage device may be comprised of an organic semiconductor.

In another illustrative example, processor unit 904 may take the form of a hardware unit that has circuits that are manufactured or configured for a particular use. This type of hardware may perform operations without needing program code to be loaded into a memory from a storage device to be configured to perform the operations.

For example, when processor unit 904 takes the form of a hardware unit, processor unit 904 may be a circuit system, an application specific integrated circuit (ASIC), a programmable logic device, or some other suitable type of hardware configured to perform a number of operations. With a programmable logic device, the device is configured to perform the number of operations. The device may be reconfigured at a later time or may be permanently configured to perform the number of operations. Examples of programmable logic devices include, for example, a programmable logic array, programmable array logic, a field programmable logic array, a field programmable gate array, and other suitable hardware devices. With this type of implementation, program code 918 may be omitted because the processes for the different embodiments are implemented in a hardware unit.

In still another illustrative example, processor unit 904 may be implemented using a combination of processors found in computers and hardware units. Processor unit 904 may have a number of hardware units and a number of processors that are configured to run program code 918. With this depicted example, some of the processes may be implemented in the number of hardware units, while other processes may be implemented in the number of processors.

In another example, a bus system may be used to implement communications framework 902 and may be comprised of one or more buses, such as a system bus or an input/output bus. Of course, the bus system may be implemented using any suitable type of architecture that provides for a transfer of data between different components or devices attached to the bus system.

Additionally, communications framework 902 may include a number of devices that transmit data, receive data, or transmit and receive data. Communications framework 902 may be, for example, a modem or a network adapter, two network adapters, or some combination thereof. Further, a memory may be, for example, memory 906, or a cache, such as found in an interface and memory controller hub that may be present in communications framework 902.

Thus, the different advantageous embodiments provide a method and apparatus for identifying information about a cluster of objects. In one advantageous embodiment, a method is provided for tracking a cluster of objects. A path for a center of mass for the cluster of objects is identified using a sequence of frames of sensor data generated by a sensor system. The path is identified with respect to a coordinate system for the sensor data. A relative path for each object in the cluster of objects is identified with respect to the coordinate system for the sensor data. The relative path is relative to the path for the center of mass for the cluster of objects. A final path for each object in the cluster of objects is identified with respect to the coordinate system for the sensor data using the path for the center of mass for the cluster of objects and the relative path for each object in cluster of objects.

The description of the different advantageous embodiments has been presented for purposes of illustration and description and is not intended to be exhaustive or limited to the embodiments in the form disclosed. Many modifications and variations will be apparent to those of ordinary skill in the art. Further, different advantageous embodiments may provide different advantages as compared to other advantageous embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method for identifying information about a cluster of objects in motion, the method comprising:

identifying a path for a center of mass for the cluster of objects using a sequence of frames of sensor data generated by a sensor system in which the path is identified with respect to a coordinate system for the sensor data, the path for the center of mass comprising an estimation of a path along which the center of mass moves from image to image in the sequence of frames;

identifying a relative path for each object in the cluster of objects with respect to the coordinate system for the sensor data using a minimization algorithm and constraints for the minimization algorithm, wherein the relative path is relative to the path for the center of mass for the cluster of objects; and identifying a final path for the each object in the cluster of objects with respect to the coordinate system for the sensor data using the path for the center of mass for the cluster of objects and the relative path for the each object in the cluster of objects, the final path comprising a sum of the path for the center of mass for the cluster of objects and the relative path for each object in the cluster of objects.

2. The method of claim 1 further comprising:
identifying a number of the objects in the cluster of objects.

3. The method of claim 1 further comprising:
identifying an intensity for the each object in the cluster of objects using the sequence of frames.

4. The method of claim 1, wherein identifying the path for the center of mass for the cluster of objects using the sequence of frames of sensor data generated by the sensor system in which the path is identified with respect to the coordinate system for the sensor data comprises:
aligning images in the sequence of frames to the coordinate system;
identifying the center of mass for the cluster of objects in each frame in the sequence of frames; and
fitting the center of mass for the cluster of objects identified in the each frame in the sequence of frames to a form of a first type of function to identify the path for the center of mass.

5. The method of claim 4, wherein identifying the relative path for the each object in the cluster of objects with respect to the coordinate system for the sensor data comprises:
identifying a second type of function for describing the relative path for the each object in the cluster of objects with respect to the coordinate system for the sensor data; and
identifying the relative path for the each object in the cluster of objects with respect to the coordinate system for the sensor data using a form of the second type of function, wherein the relative path is relative to the path for the center of mass for the cluster of objects and wherein the relative path is identified.

6. The method of claim 5 further comprising:
identifying a third type of function for describing an intensity for the each object in the cluster of objects; and
identifying the intensity for the each object in the cluster of objects using the sequence of frames and an intensity function based on the third type of function.

7. The method of claim 1, wherein identifying the relative path for the each object in the cluster of objects with respect to the coordinate system for the sensor data using the minimization algorithm and the constraints for the minimization algorithm comprises:
running the minimization algorithm to minimize a cumulative residual, wherein parameters for the minimization algorithm include first coefficients for the relative path of the each object, second coefficients for an intensity function for the each object, and a number of parameters for a point spread function for the each object; and
identifying the relative path for the each object in the cluster of objects with respect to the coordinate system for the sensor data using values for the first coefficients for the relative path of the each object that cause the cumulative residual to have a minimum value.

8. The method of claim 7 further comprising:
identifying an intensity for the each object in the cluster of objects using values for the second coefficients for the intensity function for the each object that cause the cumulative residual to have the minimum value.

9. The method of claim 7 further comprising:
identifying initial values for the parameters of the minimization algorithm.

10. The method of claim 7, wherein running the minimization algorithm to minimize the cumulative residual comprises:
running the minimization algorithm to minimize the cumulative residual based on a selected number from a set of trial numbers for a number of the objects in the cluster of objects.

11. The method of claim 10 further comprising:
identifying the number of the objects in the cluster of objects as the selected number from the set of trial numbers that causes the cumulative residual to have a first minimum value.

12. The method of claim 1 further comprising:
generating frames of the sensor data using the sensor system; and
forming the sequence of frames from the frames of the sensor data, wherein the cluster of objects is present in each frame of the sequence of frames.

13. The method of claim 1 further comprising:
generating frames of the sensor data using the sensor system, wherein each of the frames of the sensor data is an image.

14. An apparatus for identifying information about a cluster of objects in motion comprising:
a sensor system configured to generate sensor data;
a data processing system configured to receive the sensor data, to identify a path for a center of mass for a cluster of objects using a sequence of frames of the sensor data generated by the sensor system in which the path is identified with respect to a coordinate system for the sensor data, the path for the center of mass comprising an estimation of a path along which the center of mass moves from image to image in the sequence of frames; identify a relative path for each object in the cluster of objects with respect to the coordinate system for the sensor data using a minimization algorithm and constraints for the minimization algorithm, wherein the relative path is relative to the path for the center of mass for the cluster of objects; and identify a final path for the each object in the cluster of objects with respect to the coordinate system for the sensor data using the path for the center of mass for the cluster of objects and the relative path for the each object in the cluster of objects, the final path comprising a sum of the path for the center of mass for the cluster of objects and the relative path for each object in the cluster of objects.

15. The apparatus of claim 14, wherein the data processing system is further configured to identify a number of the objects in the cluster of objects.

16. The apparatus of claim 14, wherein the data processing system is further configured to identify an intensity for the each object in the cluster of objects using the sequence of frames.

17. The apparatus of claim 14, wherein in being configured to identify the path for the center of mass for the cluster of objects using the sequence of frames of sensor data generated by the sensor system in which the path is identified with respect to the coordinate system for the sensor data, the data processing system is configured to align images in the sequence of frames to the coordinate system; identify the center of mass for the cluster of objects in each frame in the sequence of frames; and fit the center of mass for the cluster of objects identified in the each frame in the sequence of frames to a form of a first type of function to identify the path for the center of mass.

18. The apparatus of claim 17, wherein in being configured to identify the relative path for the each object in the cluster of objects with respect to the coordinate system for the sensor data, the data processing system is configured to identify a second type of function for describing the relative path for the each object in the cluster of objects with respect to the coordinate system for the sensor data; and identify the relative path for the each object in the cluster of objects with respect to the coordinate system for the sensor data using a form of the second type of function, wherein the relative path is relative to the path for the center of mass for the cluster of objects and wherein the relative path is identified.

19. The apparatus of claim 18, wherein the data processing system is further configured to identify a third type of function for describing an intensity for the each object in the cluster of objects; and identify the intensity for the each object in the cluster of objects using the sequence of frames and an intensity function based on the third type of function.

20. The apparatus of claim 14, wherein in being configured to identify the relative path for the each object in the cluster of objects with respect to the coordinate system for the sensor data using the minimization algorithm and the constraints for the minimization algorithm, the data processing system is configured to run the minimization algorithm to minimize a cumulative residual, wherein parameters for the minimization algorithm include first coefficients for the relative path for the each object, second coefficients for an intensity function for the each object, and a number of parameters for a point spread function for the each object; and identify the relative path for the each object in the cluster of objects with respect to the coordinate system for the sensor data using values for the first coefficients for the relative path of the each object that cause the cumulative residual to have a minimum value.

21. The apparatus of claim 20, wherein the data processing system is further configured to identify an intensity for the each object in the cluster of objects using values for the second coefficients for the intensity function for the each object that cause the cumulative residual to have the minimum value.

22. The apparatus of claim 20, wherein the data processing system is further configured to identify initial values for the parameters of the minimization algorithm.

23. The apparatus of claim 20, wherein in being configured to run the minimization algorithm to minimize the cumulative residual, the data processing system is configured to run the minimization algorithm to minimize the cumulative residual based on a selected number from a set of trial numbers for a number of the objects in the cluster of objects.

24. The apparatus of claim 23, wherein the data processing system is further configured to identify the number of the objects in the cluster of objects as the selected number from the set of trial numbers that causes the cumulative residual to have a first minimum value.

25. The apparatus of claim 14, wherein the data processing system is further configured to:
generate frames of the sensor data using the sensor system; and
form the sequence of frames from the frames of the sensor data, wherein the cluster of objects is present in each frame of the sequence of frames.

26. The apparatus of claim 14 further comprising:
the sensor system, wherein the sensor system is configured to generate frames of the sensor data, wherein each of the frames of the sensor data is an image.

27. The apparatus of claim 26, wherein the sensor system includes a focal plane array and each frame in the sequence of frames is a focal plane image.

* * * * *